United States Patent [19]

Purcell et al.

[11] Patent Number: 4,817,746
[45] Date of Patent: Apr. 4, 1989

[54] SUSPENSION MECHANISM FOR A TRACK-TYPE VEHICLE

[75] Inventors: Robert J. Purcell, Washington; Gerald P. Simmons, Morton; Robert R. Farris, Peoria, all of Ill.

[73] Assignee: Caterpillar Inc., Peoria, Ill.

[21] Appl. No.: 136,898

[22] Filed: Dec. 22, 1987

[51] Int. Cl.$^4$ .................... B60G 5/06; B62D 55/14
[52] U.S. Cl. ............................ 180/9.1; 180/6.7; 180/24.02; 280/678; 280/683; 305/10; 305/22; 305/24
[58] Field of Search .............. 180/9.1, 9, 9.5, 9.52, 180/9.54, 9.56, 9.6, 22, 24, 24.02, 24.11, 24.12, 6.54, 6.7; 280/678, 683, 104, 6 H; 305/10, 21, 22, 24, 27, 28

[56] References Cited

U.S. PATENT DOCUMENTS

| | | | |
|---|---|---|---|
| 1,412,366 | 4/1922 | Muret | 74/665 T |
| 1,836,446 | 12/1931 | Christie | 180/9.1 |
| 1,922,768 | 8/1933 | Kegresse | 180/9.58 |
| 1,947,475 | 2/1934 | Knox et al. | 305/27 X |
| 2,011,565 | 8/1935 | Barnes | 180/9.1 |
| 2,374,240 | 4/1945 | Shankman | 305/10 X |
| 2,467,947 | 4/1949 | Skelton | 180/9.5 |
| 2,502,802 | 4/1950 | Sievers | 244/102 R |
| 2,504,128 | 4/1950 | Jacobson et al. | 305/9 |
| 2,544,985 | 3/1951 | Drakeley et al. | 305/9 |
| 2,860,715 | 11/1958 | Bouffort | 180/9.1 |
| 3,246,405 | 4/1966 | Reynolds | 37/108 R X |
| 3,254,738 | 6/1966 | Larsen | 180/9.1 |
| 3,409,309 | 11/1968 | Larsen | 280/708 |
| 3,774,708 | 11/1973 | Purcell et al. | 180/9.5 |
| 3,826,325 | 7/1974 | Purcell et al. | 180/9.54 |
| 4,325,443 | 4/1982 | Fischer | 180/6.54 |
| 4,600,069 | 7/1986 | Oswald | 180/24.02 |
| 4,681,177 | 7/1987 | Zborowski | 180/9.56 |

FOREIGN PATENT DOCUMENTS

| | | | |
|---|---|---|---|
| 1514404 | 1/1968 | France | 305/27 |
| 85/02824 | 7/1985 | PCT Int'l Appl. | |

Primary Examiner—David M. Mitchell
Assistant Examiner—Mitchell J. Hill
Attorney, Agent, or Firm—Charles E. Lanchantin, Jr.

[57] ABSTRACT

A track-type vehicle capable of high speed operation over rough terrain includes a frame supported by left-hand and righthand suspension mechanisms individually having a plurality of hydropneumatically actuated struts for supporting the frame on a plurality of wheels. An elastomeric drive belt is entrained about these wheels and is frictionally driven by an elevated drive wheel. Forces from several struts are directed into the frame in a centralized common region which minimizes rocking of the vehicle. A front idler wheel is urged forwardly and downwardly against the drive belt by a hydropneumatically actuated recoil mechanism, and a front strut also acts on the front idler wheel to resiliently urge it downwardly. A plurality of pivoting members are cooperatively connected to the struts to more evenly distribute forces against the drive belt.

21 Claims, 4 Drawing Sheets

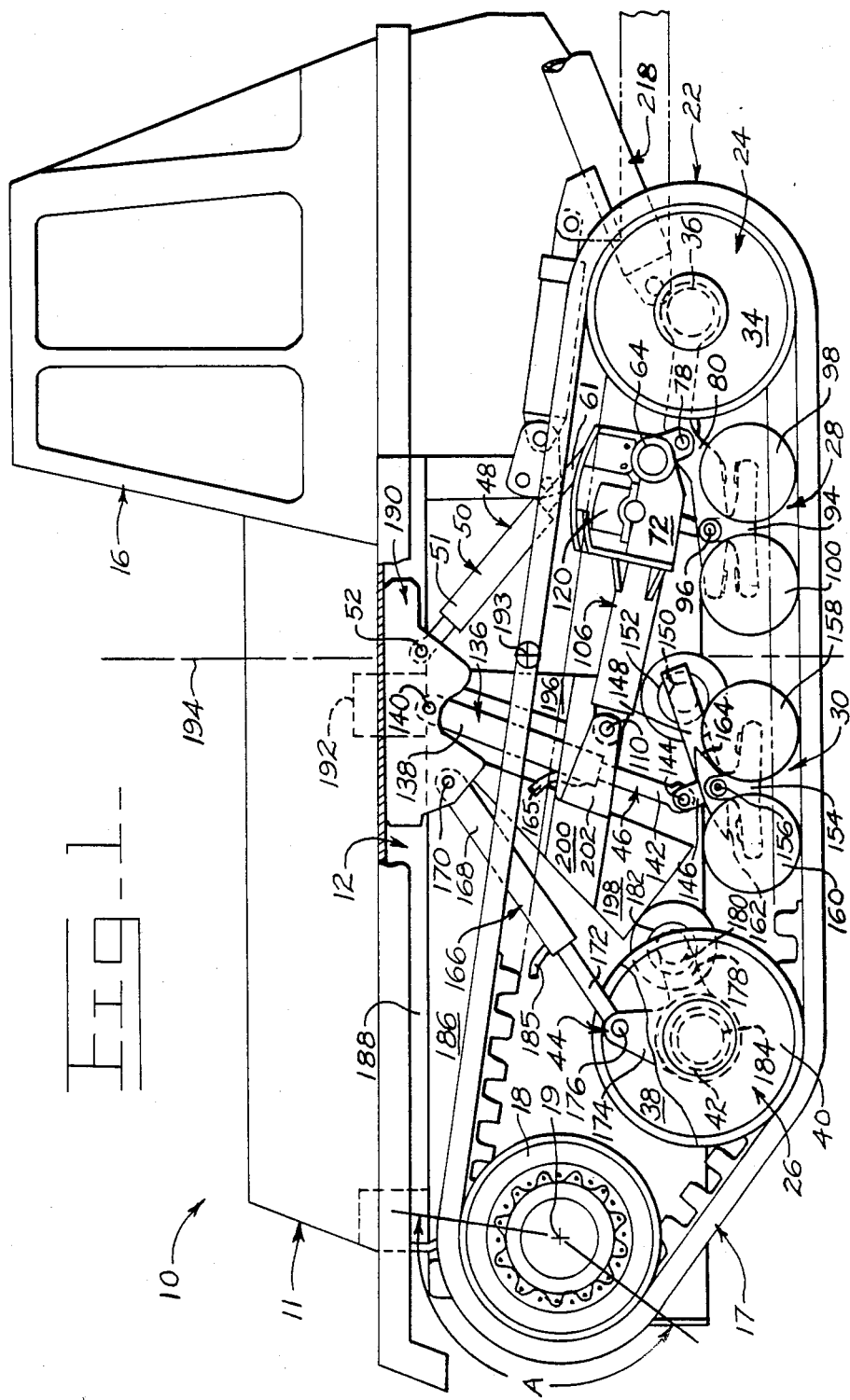

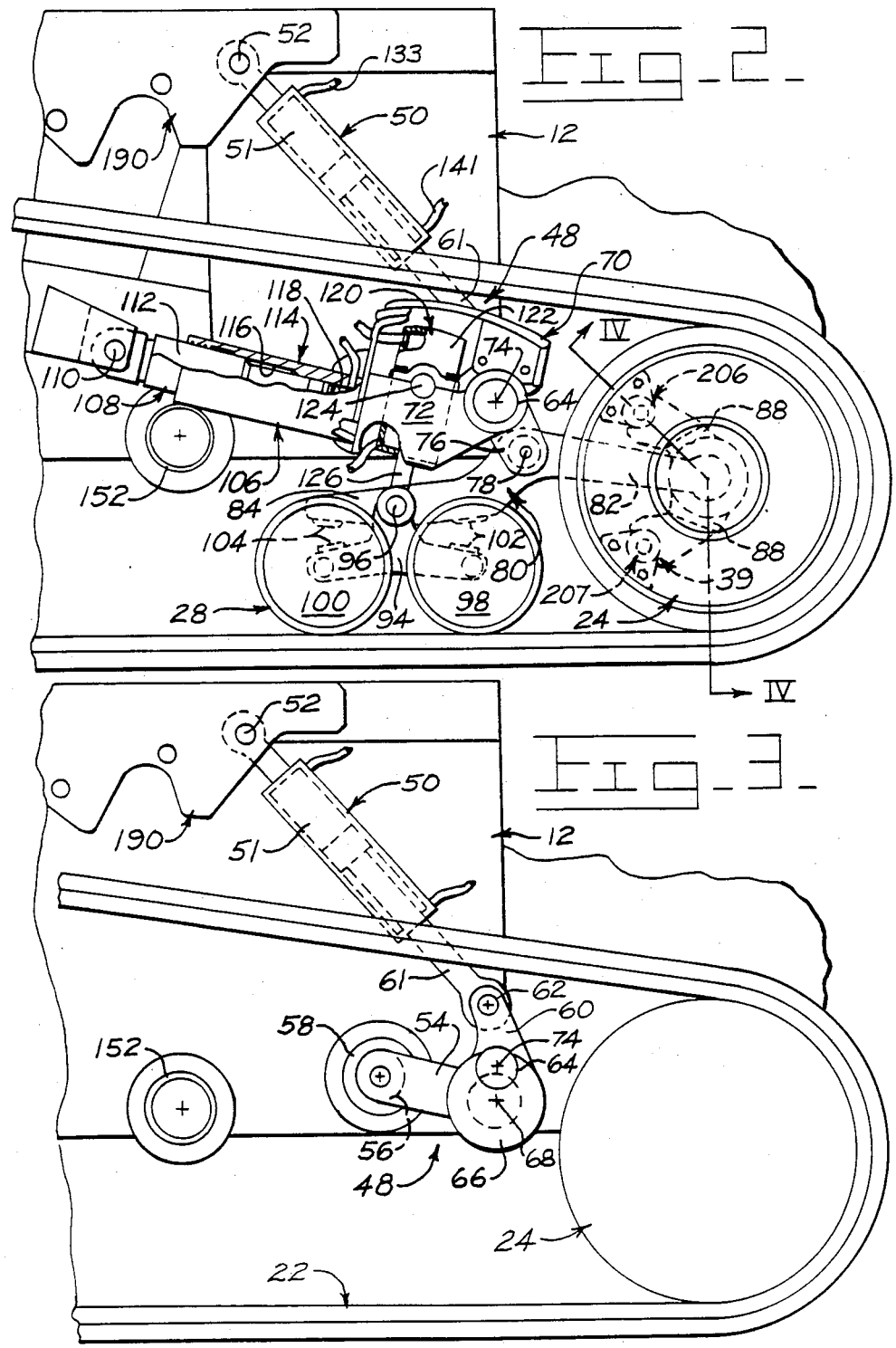

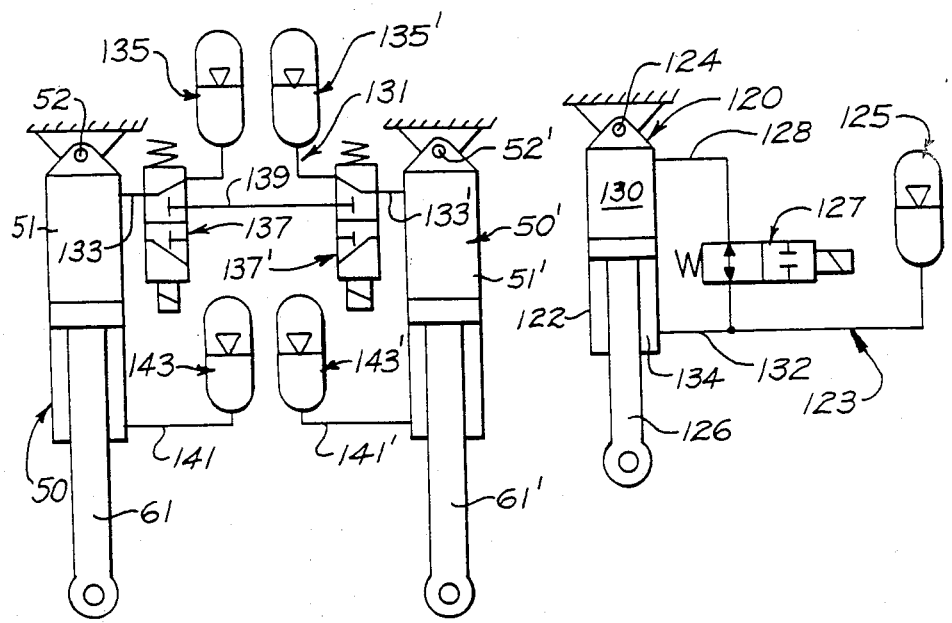
Fig_5_  Fig_6_
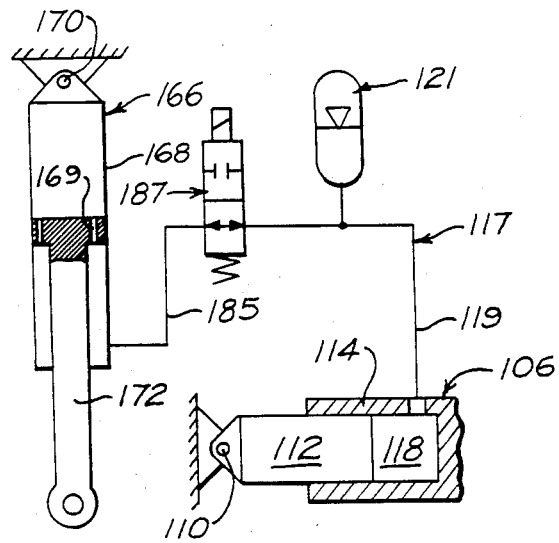
Fig_7_
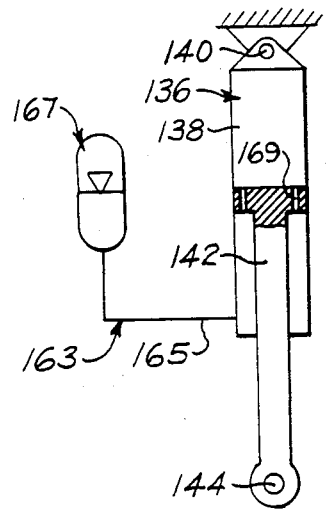
Fig_8_

SUSPENSION MECHANISM FOR A TRACK-TYPE VEHICLE

DESCRIPTION

1. Technical Field

This invention relates to a suspension mechanism for a vehicle employing endless tracks, and more particularly to a suspension mechanism permitting substantial deflection of the supporting wheels for relatively high speed operation over rough terrain while maximizing traction and uniformity of ground contact pressures.

2. Background Art

Earthmoving tractors have traditionally included left and right side undercarriage assemblies individually having a track roller frame pivotally secured to the main frame. A plurality of wheels are rigidly mounted on each track roller frame, and an endless metallic track chain is entrained about the wheels at each side. Also, a rear sprocket wheel provides positive drive to the segmented track chain. Because of such rigid construction, the supporting wheels do not conform to the irregular contour of the earth, shocks and stresses are transmitted to the main frame and to the operator, and uniformity of traction is lost. Moreover, with increasing tractor speed more vibration and noise is generated, and the ground speed is generally limited over rough terrain due to the coarseness of the ride.

Prior tractor undercarriage assemblies have incorporated recoil mechanisms behind the front idler wheels to provide a relief function. Specifically, the front idler wheel is allowed to retract rearwardly against the resistance of a coiled compression spring in order to allow a tree limb, for example, to pass between the wheel and track chain during operation. The recoil mechanism urges the front idler wheel forwardly against the looped track chain only with a sufficient force level to avoid too much slack or droop in the upper span of the track chain.

Such relatively rigid undercarriage assemblies are acceptable for low speed working tasks, but not for higher traveling speeds over rough terrain. As a partial solution to these problems, some tractors have mounted the supporting roller wheels on pivotal lever arms and/or bogies with elastomeric bumper pads incorporated between the roller frame and the lever arms. This softens the shocks transmitted by the wheels as they pass over obstacles. U.S. Pat. No. 3,774,708, issued Nov. 27, 1973 to R. J. Purcell, et al and U.S. Pat. No. 3,826,325 issued July 30, 1974 to R. J. Purcell, et al are examples of these suspension mechanisms However, while the ride is softened and the weight distribution over the length of the track chains on the ground is made more uniform, the support wheels typically exhibit a relatively limited amount of vertical travel. Furthermore, the amount of mass that is unsuspended is too great for the desired high speed traveling characteristics.

Another improvement in the area of a relatively soft suspension system for higher speed operating conditions is disclosed in U.S. Pat. No. 3,254,738 issued June 7, 1966 to D. R. Larsen. In that sprocket-driven track chain system, the usual track roller frame is eliminated, and four hydropneumatically actuated jack assemblies are used to restrain the displacement of a corresponding plurality of relatively large diameter roadwheels mounted on bellcrank assemblies. The reaction forces on the jack assemblies of that suspension system are undesirably directed to the main frame at points scattered along the length of the vehicle, and the roadwheels do not distribute the weight of the superstructure sufficiently uniformly over the track chain length to maximize traction over irregular terrain. Other undesirable attributes are that too much space is required for the suspension components and the intermediate roadwheels, insufficient space is available for proper responsiveness of the recoil mechanism, and the hydraulic portion thereof is excessively complex.

International Patent Application Publication No. WO85/02824 published July 4, 1985 under the Patent Cooperation Treaty (PCT) and U.S. Pat. No. 4,681,177 issued July 21, 1987 to D. G. Zborowski are representative of the recent evolution of frictionally driven elastomeric belt systems for tracked agricultural vehicles. These work vehicles employ an undercarriage with an endless, substantially inextensible elastomeric belt entrained about a plurality of cylindrically shaped wheels. Such systems are much smoother in operation than those incorporating segmented metallic track chains, and generally permit faster vehicle traveling speeds. Moreover, the elastomeric belts are less prone to damaging the surface of a prepared roadbed. But while these belt systems are very effective and efficient for the purposes intended, the support wheels for the belts on those constructions exhibit less vertical travel and adaptability to irregular terrain than is desired.

Basically, the belt drive mechanisms disclosed in PCT Publication No. WO85/02824 and U.S. Pat. No. 4,681,177, and mentioned above, employ a driven rear wheel, a front idler wheel, a relatively flat elastomeric belt entrained about the wheels, and a recoil/tension apparatus for urging the front idler wheel forwardly and away from the driven rear wheel. A characteristic of these systems is that the recoil/tension apparatus must provide a forwardly directed force substantially greater than that required for a positively driven metallic track chain system in order to maintain the desired tension and friction drive since the contacting cylindrical surfaces of the drive wheel and belt are relatively smooth. And, a further characteristic is that the tension level of the upper horizontal span of the belt is low when the rear drive wheel of the right side is rotating in the clockwise forward-driving direction, and the tension level of the lower horizontal span varies from a relatively high value at the rear to a relatively low value at the front due to engagement of the belt with the earth and the forces of the support wheels thereon. On the other hand, the upper span of the belt experiences relatively high tension forces when the rear drive wheel is rotating in a counterclockwise rearward driving direction and the lower span experiences a variation of a relatively high tension value at the front to a relatively low tension value at the rear. Thus, in the reverse drive direction of the driven wheel there is more tendency to retract the recoil/tension apparatus acting on the front idler wheel. It is significant to appreciate these characteristics because it has heretofore been known to employ vehicle service brakes with frictionally driven belted undercarriages only along the transverse axis of the driven rear wheels. This is undesirable from the standpoint that the predominant amount of service braking is conducted at the rear while traveling forwardly, and such forward braking and the reverse drawbar drive are acting on the belt in the same general force path relationship to retract the recoil/tension apparatus and to undesirably reduce the frictional engagement of the drive wheel and the drive belt.

Accordingly, what is needed is a suspension mechanism for a track-type vehicle which is rugged in construction, which employs a significant plurality of appropriately sized and longitudinally arranged support wheels to better distribute the weight of the superstructure, and which permits a relatively significant amount of vertical travel of each of these wheels through an associated plurality of lever arms and/or bogie supports. The suspension mechanism should preferably include a plurality of hydropneumatically actuated struts operatively associated with the wheels which are connected to the frame in such a manner as to minimize rocking forces upon the superstructure during operation of the vehicle over rough terrain, and to simplify the construction of the frame. The suspension apparatus for the front idler wheels must also be compatible with the recoil/tensioning devices for the tracks, which tracks are preferably of the friction-driven, elastomeric belt type. Moreover, the service brakes should preferably be associated solely with the front idler wheels to maximize the effectiveness thereof relative to the rear drive wheels and the required tensioning of the drive belts.

DISCLOSURE OF THE INVENTION

The present invention is directed to overcoming one or more of the above problems.

In one aspect of the invention there is provided a suspension mechanism for supporting the superstructure and frame of a vehicle which includes a driven wheel connected to the frame above the ground, a front idler wheel, a rear idler wheel, forward and rearward guide roller assemblies, and a track entrained about the wheels and guide roller assemblies. The suspension mechanism features rear suspension strut means for resiliently supporting the superstructure on the rear idler wheel, intermediate suspension strut means for resiliently supporting the superstructure on the rearward guide roller assembly, and front suspension strut means for resiliently supporting the superstructure collectively on the front idler wheel and on the forward guide roller assembly.

In another aspect of the invention there is provided a suspension mechanism for a track-type vehicle having a frame which includes a driven wheel connected to the frame above the ground, a front idler wheel, a rear idler wheel, a guide roller assembly, and a track entrained about the wheels and guide roller assembly. The suspension mechanism desirably includes rear suspension strut means for resiliently supporting the frame on the rear idler wheel and including a rear strut, intermediate suspension strut means for resiliently supporting the frame on the guide wheel assembly and including an intermediate strut, and front suspension strut means for resiliently supporting the frame on the front idler wheel and including a front strut, and with the upper ends of the struts being connected to the frame at a generally longitudinally centralized common region.

In a further aspect of the invention, there is provided a suspension mechanism for a vehicle having a frame, an elevated driven rear wheel, a front idler wheel, a rear idler wheel, forward and rearward guide roller assemblies, and an endless track entrained about the wheels and guide roller assemblies. Specifically, the suspension mechanism includes a front lever arm connected to the frame, a coupling assembly for mounting the front idler wheel and guide roller assembly on the front lever arm, a rear lever arm connected to the frame and supporting the rear idler wheel, and an intermediate lever arm connected to the frame and supporting the rearward guide roller assembly Front, rear and intermediate struts are advantageously provided which have lower ends connected to the front, rear and intermediate lever arms and upper ends connected to the frame.

And, in a still further aspect of the invention, there is provided a suspension mechanism for a vehicle having a frame which includes a driven and elevated rear wheel, a front idler wheel, a rear idler wheel located longitudinally between the driven rear wheel and the front idler wheel, and a guide roller assembly located longitudinally between the front and rear idler wheels. An endless elastomeric drive belt is entrained about the wheels and the guide roller assembly which is driven solely by friction by the driven rear wheel. A rear hydropneumatically actuated strut device supports the frame on the rear idler wheel, an intermediate hydropneumatically actuated strut device supports the frame on the guide roller assembly, and a front hydropneumatically actuated strut device supports the frame on the front idler wheel.

Each of the suspension mechanisms at each side of the vehicle incorporates rear, intermediate and front suspension struts which are continually hydropneumatically pressurized to provide the desired spring rate characteristics and vertical travel capability of the weight-supporting wheels. The upper ends of these struts are arranged in an array near a generally longitudinally centered region of the superstructure for better balance of the vehicle as it traverses over irregular terrain and for a simplified frame construction The lower end of the rear strut acts through a rear lever arm n the rear idler wheel, the lower end of the intermediate strut acts through an intermediate lever arm on a guide roller assembly preferably including a bogie member having forward and rearward roller wheels thereon, and the lower end of the front strut acts through a front lever arm collectively on the front idler wheel and a guide roller assembly preferably also including a bogie member having forward and rearward roller wheels thereon. While the front strut resists primarily vertical forces, a recoil mechanism is also incorporated that resists primarily horizontal forces upon the front idler wheel while simultaneously providing both a weight supporting function and a preselected nominal tension level of the track. Preferably also, an endless elastomeric track belt is utilized for quiet high-speed operation of the vehicle which is driven solely by friction by the elevated rear drive wheel.

BRIEF DESCRIPTION OF THE DRAWINGS

FIG. 1 is a diagrammatic right side elevational view of a vehicle employing a suspension mechanism constructed in accordance with the present invention and including a fragmentary portion of a front-mounted implement such as a conventional bulldozer blade mounted on the vehicle;

FIG. 2 is a diagrammatic and enlarged right side elevational view of the front suspension strut means shown in FIG. 1 with portions shown broken open or in broken lines to better illustrate details of construction thereof;

FIG. 3 is a diagrammatic view similar to FIG. 2 with many of the components not illustrated in order to show certain laterally inwardly spaced elements otherwise hidden in FIG. 2.

FIG. 5 is a schematic line drawing of a hydraulic system incorporating the righthand front suspension strut of FIGS. 1-3, a corresponding lefthand front suspension strut, and a plurality of accumulators and valves associated therewith;

FIG. 6 is a schematic line drawing of a hydraulic system incorporating the resilient cushioning strut shown in FIGS. 1 and 2, an associated accumulator, and a lock-out valve;

FIG. 7 is a schematic line drawing of a hydraulic system incorporating the recoil mechanism shown in FIGS. 1 and 2, the rear suspension strut illustrated in FIG. 1, an associated accumulator, and a lock-out valve; and FIG. 8 is a schematic line drawing of a hydraulic system incorporating the intermediate suspension strut of FIG. 1 and an accumulator associated therewith.

BEST MODE FOR CARRYING OUT THE INVENTION

Figure 4:
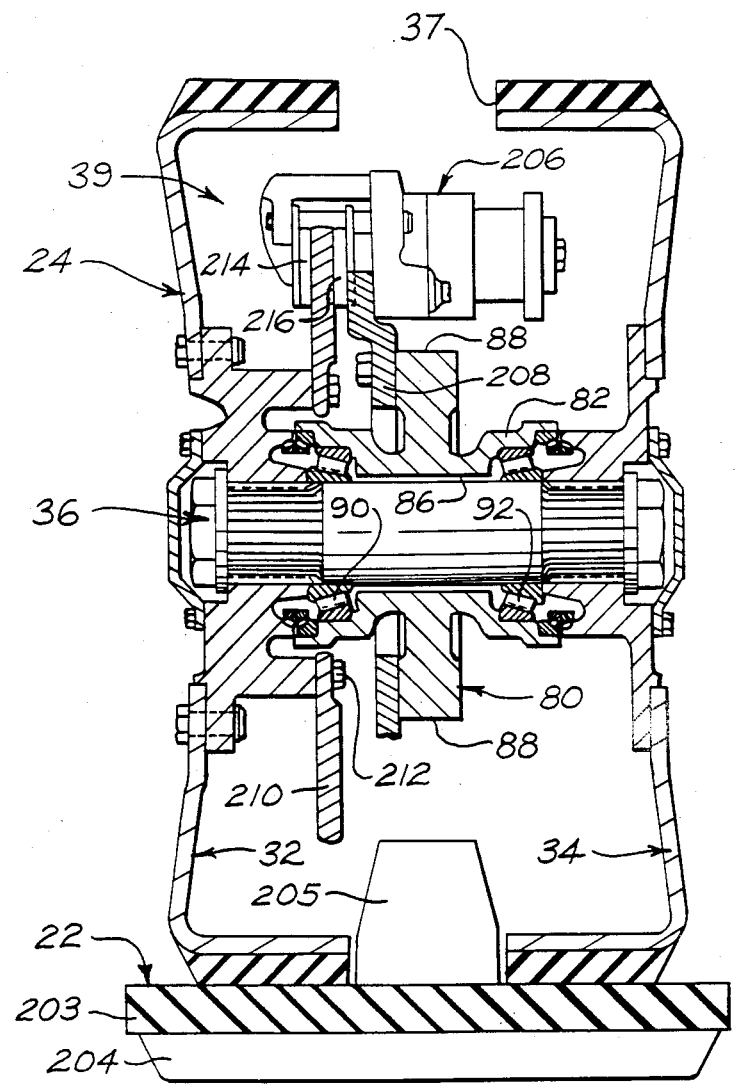
FIG. 4 is a diagrammatic and generally sectionalized view of the front idler wheel as taken along line IV—IV of FIG. 2 and showing one of the caliper disc brake assemblies contained therewithin.

With reference to FIG. 1, there is shown a vehicle 10 of the endless track-laying type having a superstructure 11 including a longitudinally extending main frame 12 and a front operator's station 16 which are collectively resiliently supported by lefthand and righthand suspension mechanisms 17, although only the righthand suspension mechanism is illustrated. Each suspension mechanism includes a rear drive wheel 18 rotatably secured to the main frame elevationally above the ground on a fixed transverse axis 19 and a ground-engaging endless track or drive belt 22 driven by the rear drive wheel solely through friction Since the suspension mechanism on one side of the vehicle is duplicated on the other side in the usual manner, only the right suspension mechanism 17 will hereinafter primarily be described.

The suspension mechanism 17 includes a first or front idler wheel 24, a second or rear idler wheel 26 located longitudinally between the front idler wheel 24 and the elevated rear drive wheel 18, and forward and rearward guide roller assemblies 28 and 30 longitudinally positioned between the front and rear idler wheels 24 and 26. As shown in FIG. 4, the front idler wheel 24 includes an axially inner side portion 32, an axially outer side portion 34, and a shaft assembly or shaft means 36 for releasably connecting the side portions together such that the side portions define an annular peripheral gap 37 between them. A braking mechanism indicated generally by the reference number 39 is disposed between the side portions as will be discussed later. The rear idler wheel 26 is similar to the front idler wheel 24 in that it has inner and outer side portions 38 and 40 connected together by a tubular shaft apparatus 42, although it is illustrated only in broken side elevation in FIG. 1.

The suspension mechanism 17 further includes a rear suspension strut device or rear suspension strut means 44 for resiliently supporting the superstructure 11 on the rear idler wheel 26, an intermediate suspension strut device or intermediate suspension strut means 46 for resiliently supporting the superstructure on the rearward guide roller assembly 30, and a front suspension strut device or front suspension strut means 48 for resiliently supporting the superstructure collectively on the front idler wheel 24 and the forward guide roller assembly 28 and for providing the desired recoil and track tensioning functions of the front idler wheel.

As shown in FIGS. 2 and 3, the front suspension strut device 48 includes a hydropneumatically actuated resilient front strut 50 having a tubular head end portion 51 pivotally connected to the main frame 12 at an upper pivot joint 52. A front lever arm 54 has a laterally inwardly extending shaft 56 which is rotatably received in a front socket assembly 58 formed in the main frame 12. A pair of upstanding ears 60, one shown, are rigidly secured to the lever arm, and a lower rod end portion 61 of the front strut is connected to these ears by a pivot pin 62. A laterally outwardly extending swingable support shaft 64 is rigidly secured to a circular plate member 66 which is rotatably mounted on the front lever arm 54. With this construction, the support shaft 64 is adaptable to limitedly pivot or swing about a transverse horizontal axis 68 through an upper arcuate range allowing generally free movement thereof in a generally horizontal and longitudinally oriented direction. As shown in FIG. 2, the swingable support shaft 64 forms a part of a coupling assembly or coupling means 70 for connecting the front idler wheel 24 and the forward guide roller assembly 28 to the front lever arm 54.

Referring to FIG. 2, the coupling assembly 70 further includes a front support assembly 72 connected to the support shaft 64 and permitted to limitedly pivot with respect thereto about another transverse horizontal axis 74. A pair of depending ears 76, one of which is shown, is secured to the front support assembly 72 and a pivot pin 78 is connected to the ears. A pivoting beam 80 is centrally mounted on the pivot pin 78 and defines a front leg 82 and a rear leg 84. As is shown in FIG. 4, the front leg 82 of the pivoting beam 80 defines a stepped bore 86 therethrough and upper and lower brake mounting flanges 88 thereon. A pair of opposed tapered bearing assemblies 90 and 92 are mounted in the stepped bore for rotatably supporting the shaft assembly 36 of the front idler wheel 24.

Referring to FIG. 2, the rear leg 84 of the pivoting beam 80 is connected to the forward guide roller assembly 28. Specifically, the guide roller assembly 28 includes a bogie member 94 which is pivotally coupled to the rear leg by a pivot pin 96. A front pair of laterally spaced roller wheels 98 and a rear pair of laterally spaced roller wheels 100 are rotatably supported on the bogie member, with it being understood that the rear leg of the pivoting beam extends longitudinally between each pair. Although only the outer roller wheel 98 and the outer roller wheel 100 are illustrated in FIG. 2, an inner roller wheel is preferably mounted on the bogie member laterally inwardly of each one for independent rotation relative to the respective outer roller wheel. On the other hand, it can be appreciated that a single roller wheel merely having laterally spaced apart rims integrally connected together could be substituted for the roller wheels 98 or the roller wheels 100 without departing from the spirit of the present invention. Counterclockwise movement of the bogie member 94 about the pivot pin 96 when viewing FIG. 2 is limited by a cooperating front pair of stop surfaces 102 defined on the rear leg and front portion of the bogie member. Similarly, clockwise movement of the bogie member when viewing FIG. 2 is limited by a rear pair of stop surfaces 104.

The front suspension strut device 48 also includes a hydropneumatically actuated recoil mechanism or recoil and tensioning means 106 for resiliently reacting to primarily substantially horizontal and longitudinally directed forces from the front idler wheel 24 and the forward guide roller assembly 28, for providing a secondary weight supporting function, and for applying a preselected nominal tension level to the drive belt 22. This is in contrast to the front strut 50 which resiliently reacts to primarily substantially vertical forces from the front idler wheel and the forward guide roller assembly The recoil mechanism 106 includes a proximal portion 108 pivotally connected to the main frame 12 by a pivot pin 110 and defining a stepped cylindrical piston 112, and also a distal portion 114 defining a stepped cylindrical bore 116 which is rigidly secured to the front support assembly 72. A reaction chamber 118 is defined within the bore in front of the piston 112 and filled with hydraulic fluid, and a single pressurized fluid conduit 119 is in communication with the reaction chamber and a first closed hydraulic system 117 as is schematically illustrated in FIG. 7.

A first gas-charged, fluid accumulator 121 is shown in FIG. 7 which is connected to the fluid conduit 119. This accumulator is of a conventional bladder type construction such as is commercially offered by Greer Hydraulic of Commerce, Calif. under Part No. 841726. Accumulator 121 controllably maintains pressure in the reaction chamber 118 and acts as a spring in response to the dynamic operating conditions of the vehicle.

The front suspension strut device 48 further includes a hydropneumatically actuated cushioning strut 120 as shown in FIG. 2 for resiliently cushioning motion between the pivoting beam 80 and the front support assembly 72. This cushioning strut has a cylindrical head end portion 122 pivotally secured to the front support assembly 72 by a pivot pin 124, and a piston rod portion 126 connected to the rear leg 84 by the pivot pin 96. As is shown in FIG. 6, a first pressurized fluid conduit 128 is in communication with a head end chamber 130 of the cushioning strut 120, and a second pressurized fluid conduit 132 is in communication with a rod end chamber 134 The cushioning strut 120, and the conduits 128 and 132 form a portion of a second closed hydraulic system 123 including a second gas-charged, fluid accumulator 125 of the bladder type as was noted above. The conduit 132 is connected directly to the second accumulator 125, but the conduit 128 is connected to conduit 132 and the second accumulator only through a two-position, solenoid operated, lock-out valve 127 biased normally to an open condition as is illustrated.

The front strut 50 is operatively associated with a third hydraulic system 131 as is generally illustrated in FIG. 5. Particularly, a head end pressurized fluid conduit 133 is in communication with a third gas-charged, fluid accumulator 135 through a two-position, solenoid operated valve 137. This third accumulator is of the piston type such as is commercially offered by Parker-Hannifin Corp. of Des Plaines, Ill. as Part No. A6R0231B1Q. In this instance, however, the conduit 133 of the righthand front strut 50 is selectively connectable to the corresponding head end conduit 133' of the lefthand front strut 50'. This connection is selectively made by the righthand valve 137, an identical lefthand valve 137' and a cross flow conduit 139 communicating between these valves. The lefthand head end conduit 33' is selectively in communication with gas-charged, fluid accumulator 135' identical to the righthand accumulator 135. The third hydraulic system also includes a rod end pressurized fluid conduit 141 which is in communication with a fourth gas-charged, fluid accumulator 143 of the same piston-type construction as the accumulators 135 and 135'. Likewise, a corresponding accumulator 143' is in communication with the rod end fluid conduit 141' of the lefthand front strut 50'. Thus, both ends of the front struts 50 and 50' are normally continually pressurized at different effective spring rates by being independently associated with the accumulators 135 and 135', and 143 and 143' in the position of the valves illustrated.

As is shown in FIG. 1, the intermediate suspension strut device 46 includes a hydropneumatically actuated intermediate strut 136 having an upper head end portion 138 pivotally connected to the main frame 12 by a pivot pin 140, and a lower piston rod portion 142 connected to a pivot pin 144 mounted between a pair of ears 146, one of which is shown. The upwardly extending ears 146 are secured to an intermediate lever arm 148 which has a laterally inwardly extending shaft 150 rotatably received in an intermediate socket assembly 152 formed in the main frame. The rearward guide roller assembly 30 includes a bogie member 154 pivotally connected to the lever arm 148 by a pivot pin 156, a front pair of laterally spaced roller wheels 158, and a rear pair of laterally spaced roller wheels 160. The lever arm 148 extends longitudinally between the respective pairs of wheels and is provided with stop surfaces 162 and 164 for limiting pivotal movement of the bogie member 154 in a manner similar to that described with respect to the front bogie member 94.

As is shown in FIG. 8, the intermediate strut 136 forms a part of a fourth closed hydraulic system 163 including a rod end conduit 165 communicating between the strut and a fifth gas-charged, fluid accumulator 167 of the conventional piston type. This figure also illustrates a plurality of passages 169 freely communicating the opposite internal chambers of the intermediate strut.

As is shown in FIG. 1, the rear suspension strut device 44 includes a hydropneumatically actuated rear strut 166 having an upper head end portion 168 pivotally secured to the main frame 12 through a pivot pin 170, and a lower piston rod portion 172 pivotally connected to a pair of upwardly extending ears 174 by a pivot pin 176. The ears, only one of which is illustrated, are rigidly secured to a rear lever arm 178 having a front, laterally inwardly extending shaft 180 pivotally received in a rear socket assembly 182 formed in the main frame 12. A rear, laterally outwardly extending shaft 184 is also rigidly secured to the rear lever arm 178, and the tubular shaft apparatus 42 connecting the rear idler wheel side portions 38 and 40 is rotatably mounted thereon.

As shown in FIG. 7, a single pressurized fluid conduit 185 is in communication with the rod end portion of the rear strut 166 and which forms a portion of the first closed hydraulic system 117. Conduits 119 and 185 are normally in fluid communication as is illustrated through a two-position, solenoid operated valve 187, such that the conduit 185 is also pressurized by the first accumulator 121. Conduit 185 can be selectively blocked or locked from communication with the conduit 119 in the second position of the valve. It is of interest to note that the intermediate strut 136 and the rear strut 166 are preferably of identical construction.

Referring to FIG. 1, the main frame 12 has a longitudinally extending upright sidewall 186, a longitudinally extending upper beam 188 which projects laterally outwardly from the sidewall, and an upper reinforced anchoring plate assembly or anchoring means 190 connected thereto for rigidly supporting the pivot pins 52, 140 and 170 of the front, intermediate and rear suspension struts 50, 136 and 166 respectively. A cross beam 192 spans between the upper beam and sidewall on the right side of the vehicle 10 and the corresponding upper beam and sidewall on the left side of the vehicle to give additional rigidity to the frame as can be easily appreciated. The center of gravity 193 of the superstructure 11 is located longitudinally near a transversely oriented vertical mid-plane 194 passing longitudinally equidistantly between the guide roller assemblies 28 and 30, or between the roller wheels 100 and 158 as is illustrated in FIG. 1. Advantageously, the anchoring plate assembly 190 is located in a generally common longitudinally centralized region on or adjacent the plane 194 and coinciding with the general longitudinal location of the cross beam 192. The struts 50, 136 and 166 are located laterally outwardly of the sidewall 186, but relatively close thereto, and laterally inwardly of the drive belt 22. On the other hand, the recoil mechanism 106 is located laterally outwardly of these struts and is pivotable about the fixed pivot pin 110. Accordingly, forward and rearward triangularly shaped platforms 196 and 198 extend laterally outwardly from the sidewall and provide a base for a bridging beam 200 extending longitudinally therebetween. Thus, the intermediate strut 136 is free to pivot between the platforms and laterally inwardly of the bridging beam. A support structure 202 for the pivot pin 110 is integrally secured to the bridging beam 200 outwardly thereof.

Rather than having a conventional multi-jointed, metallic track chain, it is preferred that the suspension mechanism 17 utilize an elastomeric drive belt 22 as is illustrated in FIG. 4. This drive belt is defined by a relatively flat elastomeric body 203 having a plurality of inclined external ground-engaging bars 204 and a plurality of internal guide members 205 integrally formed therewith. The belt is preferably reinforced by internal cables or the like, not illustrated, so that it is substantially inextensible.

Referring to FIG. 2 and the brake mechanism 39, it includes an upper caliper disc brake assembly 206 and a lower caliper disc brake assembly 207 located respectively above and below the front leg 82 of the pivoting beam 80. As is representatively shown in FIG. 4 by the upper brake assembly 206, these assemblies are disposed in a protected location between the side portions 32 and 34 of the front idler wheel 24. Each of the caliper disc brake assemblies is spring applied and pressure released and is of conventional construction such as Model 1-663-15B offered by Hayes Industrial Brake, Inc. of Mequon, Wisc. Each brake assembly is mounted on a bracket 208 releasably secured to the respective upper and lower mounting flange 88. An annular plate member or disc 210 is releasably secured to the inner side portion 32 as by a plurality of fasteners or bolts 212, and each of the brake assemblies has inner and outer brake pads 214 and 216 adapted to clampingly engage the annular plate when the brakes are applied.

A conventional front-mounted implement 218 such as a bulldozer blade, only a fragment of which is illustrated in FIG. 1, is connected to the main frame 12 underneath the operator's station 16. In this location, it is highly visible and effective to move earth or the like with forward movement of the vehicle 10.

INDUSTRIAL APPLICABILITY

When the suspension mechanism 17 is on a flat ground surface under static conditions, the angular orientation of the recoil mechanism 106 and its significant belt-tensioning forward thrust force results in the majority, if not all, of the upward load on pivot pin 78 being absorbed thereby. Particularly, the top span of the drive belt 22 is upwardly inclined toward the rear drive wheel 18 at an angle of approximately 8° with respect to a horizontal plane, whereas the angular orientation of the recoil mechanism 106 is approximately 14°. Thus, the recoil mechanism is not arranged to bisect the included angle between the upper and lower spans of the drive belt, but is desirably arranged at a steeper angle of inclination to provide a significant weight-supporting function through the front idler wheel 24 and the trailing guide roller assembly 28. Initially, the more nearly upright front strut 50 absorbs little, if any, of the upward forces on the pivot pin 78. The cooperation between the recoil mechanism and the front strut can be best explained by operating the vehicle 10 over a bump.

In operation, the suspension mechanism 17 has been constructed to allow the vehicle 10 to go over about an 8 inch high obstacle without undue rocking motion of the superstructure 11 and operator's station 16, and without the suspension mechanism normally hitting any of the limiting travel stops. Assuming a forward travel direction, the drive wheel is rotated in a clockwise direction when viewing FIG. 1 at the desired rate of speed to propel the right side endless elastomeric belt 22 in a clockwise direction. When the belt and front idler wheel 24 encounters the obstacle, a longitudinally rearwardly directed thrust component is directed against the recoil mechanism 106 through the pivoting beam 80 and the front support assembly 72 shown in FIG. 2. The reaction chamber 118 of the recoil mechanism is continuously pressurized by the first hydraulic system shown in FIG. 7 to a pressure level sufficient to urge the front support assembly forwardly with a relatively high nominal force, for example about 34,000 pounds under static conditions. The swingable support shaft 64 is allowed to initially travel rearwardly in a nearly horizontal and arcuate path about pivot axis 68 as can be appreciated by reference to FIG. 3 such that a minimum upward force on the front strut 50 is initially realized. Immediately thereafter the front idler wheel 24 is elevated such that the pivoting beam 80 rotates in a counterclockwise direction about the pivot pin 78. This elevates the pivot pin 78, causes the support assembly 72 to move incrementally rearwardly relative to the pivot pin 110, and forces some fluid from the reaction chamber 118 to the first accumulator 121 as well as to the rear strut 166 via the conduit 185 as can be appreciated by reference to FIG. 7. Since the front idler wheel 24 is on the front leg 82 of the pivoting beam 80, the upward movement thereof exerts a downward force on the pin 96 and on the bogie member 94. Each of the roller wheels 98 and 100 exhibits the same downward forces against the belt during this period for better weight distribution. The cushioning strut 120 illustrated in FIGS. 2 and 6 dampens or inhibits this counterclockwise movement of the pivoting beam only to a very limited degree because some fluid is expelled from the lower end thereof by way of the conduit 132 to pass relatively freely to the upper end by way of the conduit 128 under the pressurized conditions provided by the second accumulator 125. With upward movement of the pivot pin 78 and the swingable support shaft 64, the piston rod 61 of the front strut 50 is moved upwardly within the head portion 51, whereupon fluid from the head end portion is directed outwardly through conduit 133 and to the third accumulator 135 shown in FIG. 5. This upwardly inclined force and the momentum or inertia generated thereby is directed to the pivot joint 52 and the anchor plate assembly 190 near the longitudinal center of the superstructure 11.

When the obstacle, such as a tree limb, is climbed by the drive belt 22 and located between the front idler wheel 24 and the front roller wheels 98, the front bogie member 94 reverses from a clockwise movement relative to the pivoting beam 80 to a counterclockwise movement relative to the pivoting beam such that the front limiting stops 102 shown in FIG. 2 closely approach one another or could even touch if the forces are high enough. When the obstacle is located beneath the roller wheels 100, the front bogie member rotates oppositely to a point where the limiting stops 104 approach each other. Since the obstacle is nearly under the cushioning strut 120, there is a substantial upward force component on the piston end portion 126 shown in FIG. 6. As a result, fluid is expelled from the head end conduit 128 that volumetrically cannot be fully absorbed by the rod end conduit 132, so that some fluid is directed to the second accumulator 125 at a progressively increasing pressure level to provide the cushioning action desired.

Next, the effective rearward travel of the obstacle under the roller wheels 158 and the track belt 22 causes the counterclockwise movement of the rear bogie member 154 when viewing FIG. 1 and an upward thrust component on the pivot pins 156 and 144. The front portion of the rear bogie member approaches positive contact with the stop surface 164, and the intermediate lever arm 148 is caused to rotate in a clockwise direction about the socket assembly 152. At this stage, fluid is transferred generally from the head end portion 138 to the rod end portion via the passages 169 illustrated in FIG. 8, and must be expelled from the conduit 165 to the fifth accumulator 167 under an increasing pressure level due to the volumetric difference between the head end portion 138 and the piston rod portion 142. The additional upward force component which is generated is again desirably directed to the anchoring plate assembly 190 near the longitudinal center plane 194 of the vehicle 10.

And lastly, the obstacle travels under the rear idler wheel 26 causing the clockwise movement of the rear lever arm 178 about the socket assembly 182. The increased upward forces on the resilient rear strut 166 cause it to telescopingly retract with the forces again being directed to the anchoring plate assembly 190. During retraction of the rear suspension strut 166, fluid is displaced from the conduit 185 shown in FIG. 7 and directed to the reaction chamber 118 of the recoil mechanism 106 as well as to the pressurized first accumulator 121. The result is that the distal portion 114 of the recoil mechanism is urged forwardly, along with the shaft 64 and pivot pin 78, to urge the front idler wheel 24 forwardly and maintain proper tension of the drive belt 22 under the increased pressure levels established by the first accumulator 121.

In one embodiment of the suspension mechanism 17, the rear idler wheel 26 is permitted to controllably travel upwardly about 10 inches and downwardly about 2 inches when compared with its static ground level position. Such movement is arcuate since the rear lever arm 178 supporting the rear idler wheel travels about the socket assembly 182, and is controlled by the dynamic fluid displacement characteristics of the telescoping rear strut 166, the recoil mechanism 106 acting on the drive belt 22, and the parameters of the first accumulator 121 shown in FIG. 7.

The front idler wheel 24 can travel upwardly about 15 inches when compared with the static level state primarily under the dynamic response characteristics of the telescoping front strut 50 and the third accumulator 135 shown in FIG. 5, and secondarily under the dynamic response characteristics of the recoil mechanism 106 and the first accumulator 121 shown in FIG. 7. When the recoil mechanism 106 rotates upwardly in a counterclockwise direction when viewing FIG. 1, the amount of vertical forces absorbed thereby decreases substantially because it approaches a horizontal inclination. This can be referred to as a negative spring rate. Simultaneously, the front strut 50 rapidly reacts to increasingly absorb the upward forces upon the support shaft 64. This can be referred to as a more normal positive spring rate. The front idler wheel can travel downwardly about 7.5 inches under the collective action of the front strut 50 and third accumulator 135 shown in FIG. 5, the recoil mechanism 106 and first accumulator 121 shown in FIG. 7, and also the cushioning strut 120 and the second accumulator 125 illustrated in FIG. 6. The pivot pin 96 of the forward guide roller assembly 28 can travel upwardly over 8 inches and downwardly over 4 inches under the control of these same struts and accumulators.

The intermediate strut 136 and the fifth accumulator 167 shown in FIG. 8 controls the displacement characteristics of the rearward guide roller assembly 30 such that, for example, the pivot pin 156 can travel upwardly about 7.5 inches and downwardly about 3.5 inches. It can therefore be appreciated that the suspension mechanism 17 allows a substantial amount of vertical travel of the supporting wheels both above and below the level ground line conditions while continuously urging the wheels downwardly against the drive belt under the "tuned" dynamic response of the struts 50,120,136 and 166, the recoil mechanism 106, and the associated hydraulic systems 117,123,131 and 163.

In connection with the downward movement of the front idler wheel 24, such as could be expected when the vehicle initially travels over a trench or depression, it can be appreciated that the rod end portion 61 of the front strut 50 would be urged downwardly when viewing FIG. 5 by the pressurized accumulator 135 acting on the head end portion 51. This is, however, desirably against the soft resistance or cushioning action of the fourth accumulator 143 associated with the rod end portion 61.

One of the features of the suspension mechanism 17 is that the rear drive wheel 18 shown in FIG. 1 is elevated and non-weight-carrying so that it doesn't have to be included in the dynamic suspension system for supporting the superstructure 11. At this location, the axis 19 thereof is stationary so that the power train construction to the drive wheel is simplified. Moreover, while a ground level drive wheel is prone to the ingestion of mud and debris which can result in slippage of the drive belt 22, the elevated location of the drive wheel 18 provides an opportunity for the belt to naturally clean itself due to gravity before reaching the drive wheel.

Another feature of the suspension mechanism 17 is that the drive belt 22 makes directional changes in the endless loop as a result of encircling just the three similarly sized wheels 18, 24 and 26 of relatively large diameter. Thus, the belt does not experience abrupt changes in direction at these larger wheels even when the vehicle 10 traverses irregular terrain. And since the rear idler wheel 26 is located longitudinally between the drive wheel 18 and the front idler wheel 24, there is a very desirable increase in the circumferential angular degree of contact between the drive belt and the drive wheel, in contrast to those systems having an elevated drive wheel located longitudinally between the front and rear idler wheels. As is shown in FIG. 1 by the included angle identified by the letter A, the wrap angle is approximately 150° when viewing along transverse axis 19. This relatively significant angular relationship assures a substantial area of frictional contact for more positive engagement of the drive wheel with the belt.

Furthermore, between the front and rear weight-carrying idler wheels 24 and 26, there are four pairs of weight-carrying roller wheels 98, 100, 158 and 160 to better distribute superstructure loads against the drive belt 22. These similarly sized roller wheels are roughly half the diameter of the front and rear idler wheels, and allow the roller wheels to be substantially equally spaced in the longitudinal direction so that the downward forces are relatively uniformly transmitted to the belt. Also, by sizing the roller wheels in this way more space is provided above them for the remainder of the suspension mechanism within the confines of the belt loop. Note, for example, that the recoil mechanism 106 is physically located directly above the roller wheels 98,100 and 158 within the loop of the drive belt. As used herein, the term "roller wheel" is distinguishable from the term "idler wheel" by being smaller in diameter and also by being normally positioned tangentially against the drive belt rather than having an included angle of wrap representative of a change in the angular direction of the drive belt.

The hydraulic systems 117,123,131 and 163 illustrated in FIGS. 5-8 are constructed to selectively provide optimal vehicular traveling characteristics of the suspension mechanisms 17 at relatively high rates of speed, or optimal working characteristics at relatively low ground speeds. The desired softer spring rate action of the struts 50,120,136 and 166 when traveling at a high speed is accomplished by placing the valves 127,137,137' and 187 in the positions illustrated in FIGS. 5, 6 and 7. On the other hand, when prying out a boulder or tree trunk from the earth by the front-mounted bulldozer blade 218 while traveling forwardly at a relatively low rate of speed, it is desirable to move the lock-out valve 127 shown in FIG. 6 to the lock-out position wherein the head end conduit 128 is blocked and the full resilient action of the cushioning strut 120 is prevented. This provides a more stable platform under the front suspension strut device 48 shown in FIG. 2 because the rear leg 84 of the pivoting beam 80 cannot effectively rotate upwardly about pivot pin 78. Simultaneously, the lock-out valve 187 is also moved to a position to block communication between the conduits 185 and 119 shown in FIG. 7. This rigidifies the rear strut 166 shown in FIG. 1 so that a more rigid platform is provided at the rear suspension strut device 44. And further, the valves 137 and 137' of FIG. 5 are positioned to block communication between the conduits 133 and 133' and the third accumulators 135 and 135' respectively, and to directly interconnect the conduits 133 and 133'. Thus the head end portions of the front struts 50 and 50' are in free fluid communication forming the hydraulic equivalent of an equalizer bar. For example, the righthand coupling assembly 70 shown in FIG. 2 can oscillate upwardly and the lefthand coupling assembly 70', not shown, can oscillate downwardly at the same time in concert if the upward forces on the righthand rod end portion 61 are greater than that on the lefthand rod end portion 61'. The rod end portion 61 will telescopically retract, and the lefthand rod end portion 61' will extend the same relative amount to result in a laterally stabilizing front platform action between the opposite sides. In many instances of slow forward movement of the bulldozer blade 218 it is desirable to allow the full resilient reaction of the cushioning strut 120 with the lock-out valve 127 disposed in the non-blocking position, while the remainder of the suspension mechanism 17 is stablized by placing the lock-out valve 187 in the blocking condition, and the valves 137 and 137' in their second positions to permit cross flow in the conduit 139.

In view of the foregoing, it is apparent that the suspension mechanism 17 of the present invention is simple, rugged, economical and adaptable conveniently to high speed traveling or relatively low speed working conditions of the vehicle 10. The suspension mechanism employs a front suspension strut device 48 for allowing significant vertical travel of the front idler wheel 24 while accommodating to the balancing loading of the forward guide roller assembly 28 and the rollers 98 and 100 thereof, and while balancing the spring rate characteristics of the recoil mechanism 106, the front strut 50 and the cushioning strut 120. The front suspension strut device 48 urges the front idler wheel 24 continually toward the ground, while the braking device 39 cooperates therewith through a wrap angle between the front idler wheel and drive belt 22 of substantially or nearly 180° (specifically $180° - 8° = 172°$). Thus the frictional contact therebetween is substantial, and there is less tendency for the frictional contact forces between the rear drive wheel 18 and the drive belt 22 to be reduced to undesirable levels. It further employs a rear suspension device 44 for allowing significant vertical travel of the rear idler wheel 26, and an intermediate suspension device 46 for allowing significant vertical travel of the rearward guide roller assembly 30 through the spring rate characteristics of the rear strut 166 and intermediate strut 136 respectively. With dynamic loading of the upwardly arrayed front, intermediate and rear struts 50, 136 and 166, the upward forces on the anchoring plate assembly 190 are directed into the superstructure 11 near the longitudinal center of the vehicle so that the vehicle travels in a much smoother manner over irregular terrain. Also, the structure of the main frame 12 is simplified since it is not necessary to have massive reinforcement along the full length thereof. The smaller roller wheels 98,100,158 and 160, the load-equalizing minor bogie members 94 and 154, and the load-equalizing pivoting beam or major bogie member 80 more evenly distributes the weight of the superstructure 11 to the drive belt 22 between the idler wheels 24 and 26. And furthermore, the laterally spaced apart side portions 32 and 34 of the front idler wheel 24 shown in FIG. 4 provides a protected region for the brake assemblies 206 and 207 and allows the guide members 205 of the drive belt to be positioned therebetween for lateral containment of the drive belt. In this regard the remaining wheels are similarly constructed to have inner and outer portions for the same purpose although not specifically illustrated in the drawings.

Other aspects, objects and advantages of this invention can be obtained from a study of the drawings, the disclosures and the appended claims.

We claim:

1. A suspension mechanism for supporting a superstructure and a frame of a vehicle, includes a drive wheel rotatably secured to the frame above the ground, a front idler wheel, a rear idler wheel, a forward guide roller assembly, a rearward guide roller assembly, and a track entrained about the wheels and the guide roller assemblies, comprising:
   rear suspension strut means for resiliently supporting the superstructure on the rear idler wheel;
   intermediate suspension strut means for resiliently supporting the superstructure on the rearward guide roller assembly; and
   front suspension strut means for resiliently supporting the superstructure collectively on the front idler wheel and the forward guide roller assembly, the forward and rearward guide roller assemblies being located longitudinally between the front and rear idler wheels, and the track wrapping partially around the front idler wheel.

2. The suspension mechanism of claim 1 wherein the front suspension strut means includes a resilient front strut, a socket assembly fixedly secured to the frame, a front lever arm pivotally connected to the frame socket assembly and extending forwardly to a connection with the front strut, and coupling means for connecting the front idler wheel and the forward guide roller assembly to the front lever arm.

3. The suspension mechanism of claim 2 wherein the coupling means includes a pivoting beam having a front leg and a rear leg rigidly interconnected therewith, and pivot means for supporting the pivoting beam for rocking motion generally longitudinally centrally thereof, the front idler wheel being connected to the front leg and the forward guide roller assembly being connected to the rear leg.

4. The suspension mechanism of claim 3 wherein the front suspension strut means includes recoil means for resiliently reacting to primarily substantially horizontal forces from the front idler wheel and the forward guide roller assembly, the front strut resiliently reacts to primarily substantially vertical forces from the front idler wheel and forward guide roller assembly, the coupling means includes a swinging element connected to the front lever arm, and the recoil means includes a proximal portion pivotally connected to the frame and a distal portion pivotally connected to the swinging element.

5. The suspension mechanism of claim 2 wherein the intermediate suspension strut means includes a resilient intermediate strut, and an intermediate lever arm connected to the frame, the intermediate strut, and the rearward guide roller assembly, the rear suspension strut means includes a resilient rear strut, and a rear lever arm connected to the frame, the rear strut, and the rear idler wheel; and the rear, intermediate and front struts extend upwardly and are pivotally connected to the frame at a generally common longitudinally centralized region.

6. The suspension mechanism of claim 1 wherein each of the rear, intermediate and front strut means includes a hydropneumatically actuated strut and a gas-charged, fluid accumulator individually associated therewith.

7. The suspension mechanism of claim wherein the front suspension strut means includes a pivoting beam having a front leg and a rear leg rigidly interconnected with the front leg, the front idler wheel being connected to the front leg, and the forward roller assembly being connected to the rear leg.

8. The suspension mechanism of claim 7 wherein the front suspension strut means includes a recoil mechanism, the forward guide roller assembly includes a bogie member pivotally connected to the rear leg of the pivoting beam, roller wheel means connected to the bogie member for reacting against the track in opposition to the action of the front idler wheel, and cushioning strut means for cushioning movement of the pivoting beam relative to the recoil mechanism.

9. The suspension mechanism of claim 1 wherein the forward guide roller assembly includes a forward pair of laterally spaced roller wheels and a rearward pair of laterally spaced roller wheels, the rearward guide roller assembly includes a forward pair of laterally spaced roller wheels and a rearward pair of laterally spaced roller wheels, and these roller wheels are approximately half the diameter of the front and rear idler wheels.

10. The suspension mechanism of claim 9 wherein each of the rear, intermediate, and front strut means includes a hydropneumatically actuated strut extending upwardly and pivotally connected to the frame at a generally common longitudinally centralized region.

11. A suspension mechanism for a vehicle having a frame, a drive wheel rotatably secured to the frame above the ground, a front idler wheel, a rear idler wheel, a guide roller assembly located longitudinally between the front and rear idler wheels, and a track entrained about the wheels and the guide roller assembly and wrapping partially around the front idler wheel, comprising:
   rear suspension strut means for resiliently supporting the frame on the rear idler wheel and including a resilient rear strut having an upper end;
   intermediate suspension strut means for resiliently supporting the frame on the guide roller assembly and including a resilient intermediate strut having an upper end; and
   front suspension strut means for resiliently supporting the frame on the front idler wheel and including a resilient front strut having an upper end, the upper ends of the struts being connected to the frame at a generally longitudinally centralized common region.

12. The suspension mechanism of claim 11 wherein the rear suspension strut means includes a rear lever arm pivotally connected to the frame, the rear strut, and the rear idler wheel; the intermediate suspension strut means includes an intermediate lever arm pivotally connected to the frame, the intermediate strut, and the guide roller assembly; and the front suspension strut means includes a front lever arm pivotally connected to the frame and extending forwardly to a connection with the front strut, and coupling means for connecting the front idler wheel to the front lever arm.

13. The suspension mechanism of claim 12 wherein the front suspension strut means includes another guide roller assembly and wherein the coupling means includes a pivoting beam having a front leg and a rear leg rigidly interconnected to the front leg, the front idler wheel being connected to the front leg and the another guide roller assembly being connected to the rear leg.

14. The suspension mechanism of claim 11 wherein the front suspension strut means includes another guide roller assembly, a pivoting beam connected to the front idler wheel and to the another guide roller assembly, a support assembly, and another resilient strut connected between the pivoting beam and the support assembly.

15. A suspension mechanism for a track-type vehicle having a frame, a rear drive wheel rotatably secured to the frame above the ground, and in series arranged relation longitudinally along the frame adjacent the ground a rear idler wheel, a rearward guide roller assembly, a forward guide roller assembly, and a front idler wheel, and an endless track entrained about the wheels and the guide roller assemblies and wrapping partially around the front idler wheel, comprising:
- a front lever arm pivotally connected to the frame;
- coupling means for mounting the front idler wheel and the forward guide roller assembly on the front lever arm, the coupling means including a pivoting beam having a front leg connected to the front idler wheel, a rear leg connect rigidly to the front leg and connected to the forward guide roller assembly, and pivot means for supporting the pivoting beam for rocking motion generally longitudinally centrally thereof;
- a rear lever arm pivotally connected to the frame and rotatably supporting the rear idler wheel;
- an intermediate lever arm pivotally connected to the frame and rotatably supporting the rearward guide roller assembly; and
- front, rear and intermediate resilient struts individually having lower ends connected to the front, rear and intermediate lever arms respectively and upper ends connected to the frame.

16. A suspension mechanism for a vehicle having a frame, a rear drive wheel rotatably secured to the frame elevationally above the ground, a front idler wheel, a rear idler wheel located longitudinally between the rear drive wheel and the front idler wheel, and forward and rearward guide roller assemblies located longitudinally between the front and rear idler wheels, comprising:
- an endless elastomeric belt entrained about the wheel and the guide roller assemblies and wrapping partially around the front idler wheel, and driven solely by friction by the rear drive wheel;
- rear hydropneumatically actuated strut means resiliently supporting the frame on the rear idler wheel;
- intermediate hydropneumatically actuated strut means resiliently supporting the frame on the rearward guide roller assembly; and
- front hydropneumatically actuated strut means for resiliently supporting the frame collectively on the front idler wheel and the forward guide roller assembly.

17. The suspension mechanism of claim 16 wherein each of the guide roller assemblies includes a bogie member and a forward and rearward roller wheels rotatably mounted on the bogie member, the roller wheels being of similar size and approximately half the diameter of the front and rear idler wheels.

18. The suspension mechanism of claim 16 wherein the front hydropneumatically actuated strut means includes a support assembly, a pivoting beam centrally connected to the support assembly and connected to the front idler wheel and the forward guide roller assembly, and a cushioning strut connected between the support assembly and the pivoting beam.

19. The suspension mechanism of claim 16 wherein the front hydropneumatically actuated strut means includes a front strut adaptable to resiliently react to primarily vertical forces on both the front idler wheel and the forward guide roller assembly and a hydropneumatically actuated recoil mechanism adaptable to resilient react to primarily horizontal forces on the front idler wheel.

20. The suspension mechanism of claim 19 wherein the front hydropneumatically actuated strut means includes a pivoting beam having a front leg and a rear leg rigidly interconnected with the front leg, and wherein the front idler wheel is mounted on the front leg and the forward guide roller assembly is mounted on the rear leg.

21. The suspension mechanism of claim 20 wherein the front hydropneumatically actuated strut means includes a support assembly and a hydropneumatically actuated strut located between the support assembly and the pivoting beam.

* * * * *